United States Patent
Finlay

[11] 3,844,129
[45] Oct. 29, 1974

[54] ARCTIC PIPELAYING

[75] Inventor: Robert B. Finlay, Houston, Tex.

[73] Assignee: Global Marine Inc., Los Angeles, Calif.

[22] Filed: Apr. 2, 1973

[21] Appl. No.: 347,148

[52] U.S. Cl. ............................... 61/72.3, 114/67 A
[51] Int. Cl. ........................... F16l 1/00, B63b 1/34
[58] Field of Search ......... 61/72.3, 72.1, 72.4, 46.5; 114/67 A

[56] References Cited
UNITED STATES PATENTS

| | | | |
|---|---|---|---|
| 2,910,835 | 11/1959 | Timothy | 61/72.3 |
| 3,481,296 | 12/1969 | Stephens | 114/67 A |
| 3,524,326 | 8/1970 | Craste | 61/72.3 |
| 3,559,413 | 2/1971 | Silverman | 61/72.3 |
| 3,693,729 | 9/1972 | Blurton et al. | 61/46.5 X |

FOREIGN PATENTS OR APPLICATIONS

441,135  1/1968  Switzerland.......................... 61/72.3

Primary Examiner—Jacob Shapiro
Attorney, Agent, or Firm—Christie, Parker & Hale

[57] ABSTRACT

In laying submarine pipelines and the like in ice covered water, the pipeline is made up horizontally on a make-up platform. The platform is supported over the pipeline route and above the water surface and a covering ice sheet on a cushion of air which has a pressure sufficient to cause breakage of the adjacent ice. The pipeline is fed into the water rearwardly from the make-up platform. A support platform is disposed rearwardly of the make-up platform and is coupled to the make-up platform by a bridge structure. The pipeline, at spaced locations rearwardly of the make-up platform, is engaged by corresponding ones of a plurality of separately operable coupling assemblies. The coupling assemblies are supported by cables and winches at corresponding spaced locations along the bridge structure and the support platform. The effective lengths of the several cables are adjusted to define a desired support path for the pipeline. The coupling assemblies are moved relatively along the pipeline toward the make-up platform in conjunction with the feeding of the pipeline from the platform and in conjunction with the advancement of the platforms along the line of the pipeline. Preferably, the coupling assemblies are distributed along that portion of the pipeline which includes the overbend and sag-bend of the pipeline between the make-up platform and the sea floor. At least some of the coupling assemblies are operated to inhibit movement of the pipeline therepast away from the make-up platform so that the coupling assemblies serve to maintain tension in the pipeline between the make-up platform and the sea floor.

28 Claims, 13 Drawing Figures

ARCTIC PIPELAYING

BACKGROUND OF THE INVENTION

1. Field of the Invention:

This invention pertains to submarine pipelines and, more particularly, to procedures and apparatus for laying pipelines under ice covered waters, as in the Arctic.

2. Review of the Prior Art:

Current techniques for laying submarine pipelines are limited to use in waters of 400 feet in depth or less. Also, current techniques are basically those which have been developed for use in temperate and tropic waters and are not readily applicable to the laying of submarine pipelines in arctic waters except in those brief periods when arctic waters are free of ice. Because the ice-free season in arctic waters is very short in those areas where needs for submarine pipelines are now developing, and because ice-free conditions may not exist in those areas in any given year, the cost of laying arctic submarine pipelines presently is very high; the presence of rough water during ice-free periods further restricts the appeal of current pipelaying practices in the arctic.

Presently the best accepted and most reliable submarine pipelaying practices involve the use of pipeline tensioners on a barge where the pipeline is made up horizontally, and the use of a stinger coupled to the barge to guide the growing pipeline from the barge toward the sea floor. The stinger is an elongate structure which supports the pipeline partially along its length between the barge and the sea floor. The principal function of the stinger is to prevent the pipeline from bending with too great a curvature between the barge and the sea floor. Tensioners are located on the barge to impart tension to the pipeline adjacent its make-up end; such tension prevents the pipeline from falling from the barge and also assists in preventing excess bending in the pipeline behind the barge, which bending could result in failure of the pipeline.

Current practice could be extended to water depths in excess of 400 feet by increasing the size of the tensioner and stinger units. This approach, however, greatly increases the cost of the equipment needed for pipelaying, and is not appealing, especially in arctic situations. Also, in greater water depths, the pipeline bending problems are increased, particularly in the sag-bend area adjacent the sea floor where the pipeline bends from an inclined path to a substantially horizontal path along the sea floor. Existing stingers support the pipeline primarily in its overbend area adjacent the barge, although stingers capable of supporting the overbend and sag-bend portions of the pipeline have been described for shallow-water applications.

U.S. Pat. No. 3,559,413 describes marine pipelaying apparatus intended for use in greater water depths than are feasible with stingers of more conventional design. According to this patent, the pipeline between the make-up barge and the sea floor is engaged by a plurality of passive trough-like supports, each support being suspended by cables from winches carried on a corresponding float. The several floats are serially interconnected by cables between the make-up barge and another vessel behind the barge. The several winches are operated to adjust the curvature of the pipeline support path defined by the several support troughs. By the use of many floats and support troughs, the pipeline can be supported in the desired manner over its entire extent between the barge and the sea floor.

The apparatus described in U.S. Pat. No. 3,559,413 can be used effectively only in waters where no ice is present in the path of the floats. Broken ice would be present in the path of the floats where the make-up barge either acts as an icebreaker or operates in the track made by a separate icebreaker. Thus, the procedures and apparatus described in this patent are not suited for the laying of pipelines under ice covered waters.

The specific prior art considered during the preparation of this application includes, but is not limited to, the following United States patents:

| | |
|---|---|
| Re. 23,963 | 3,411,307 |
| 2,981,074 | 3,472,034 |
| 3,125,859 | 3,487,648 |
| 3,251,332 | 3,507,126 |
| 3,273,346 | 3,533,244 |
| 3,331,212 | 3,559,413 |

SUMMARY OF THE INVENTION

This invention provides novel, simple and effective methods and apparatus for laying a pipeline in ice covered waters, whereby pipelines can be laid in arctic waters during most of the year when conventional practice cannot be used for the reasons previously given. Also, the present invention can be used to advantage in temperate or tropic waters to lay pipelines in greater water depths than is within the capabilities or reasonable extensions of current practice. Accordingly, the present invention addresses itself to a present and rapidly increasing need and provides a useful and effective solution to that need.

Generally speaking, in terms of procedure, this invention provides a method for laying submarine pipelines and the like in ice covered waters. In practicing this method, the pipeline is made up on a make-up platform. The platform is supported at a location over the line along which the pipeline is to be laid at a position above the water surface and a covering ice sheet on a cushion of air at a sufficient pressure to cause breakage of the adjacent ice sheet. The method also includes feeding made-up pipeline into the water rearwardly from the make-up platform, and coupling a support platform, disposed a selected distance rearwardly from the make-up platform, to the make-up platform by a bridge structure. The method also includes engaging the pipeline at spaced locations along its length rearwardly of the make-up platform with corresponding ones of a plurality of separately operable coupling assemblies each of which is supported by cable means to corresponding spaced locations along the bridge structure and the support platform. The effective lengths of the several cable means are adjusted to define a desired support path for the aforesaid length of pipeline.

In terms of apparatus, this invention includes a buoyant make-up platform which includes means for connecting an increment of pipeline to a make-up end of a continuum of pipeline, and for discharging the continuum rearwardly from the make-up platform along the line along which the pipeline is to be laid. Means are provided for supporting the make-up platform at a desired location along the line above the water surface, and above ice covering the water, on a cushion of air at a pressure sufficient to cause breakage of the adjacent ice. The apparatus includes a buoyant support platform. The apparatus also includes an elongate bridge structure which is coupled between the make-up and support platforms for disposing the support platform a selected distance rearwardly from the make-up platform. The present apparatus further includes a plurality of separately operable support assemblies for supporting a pipeline continuum for a portion of its length rearwardly adjacent the make-up platform below the bridge structure and the support platform. Each support assembly includes a coupling assembly releasably engageable about the continuum. The support assemblies also include cable means connected between the coupling assembly and a corresponding one of a plurality of stations spaced along the bridge structure and the support platform. Controllable means are located at each of these stations for taking in and paying out the associated cable means.

DESCRIPTION OF THE DRAWINGS

The above-mentioned and other features of this invention are more fully set forth in the following detailed description of presently preferred embodiments of this invention, which description is presented with reference to the accompanying drawings in which.

DESCRIPTION OF THE ILLUSTRATED EMBODIMENTS

Figures 1, 8, 9:
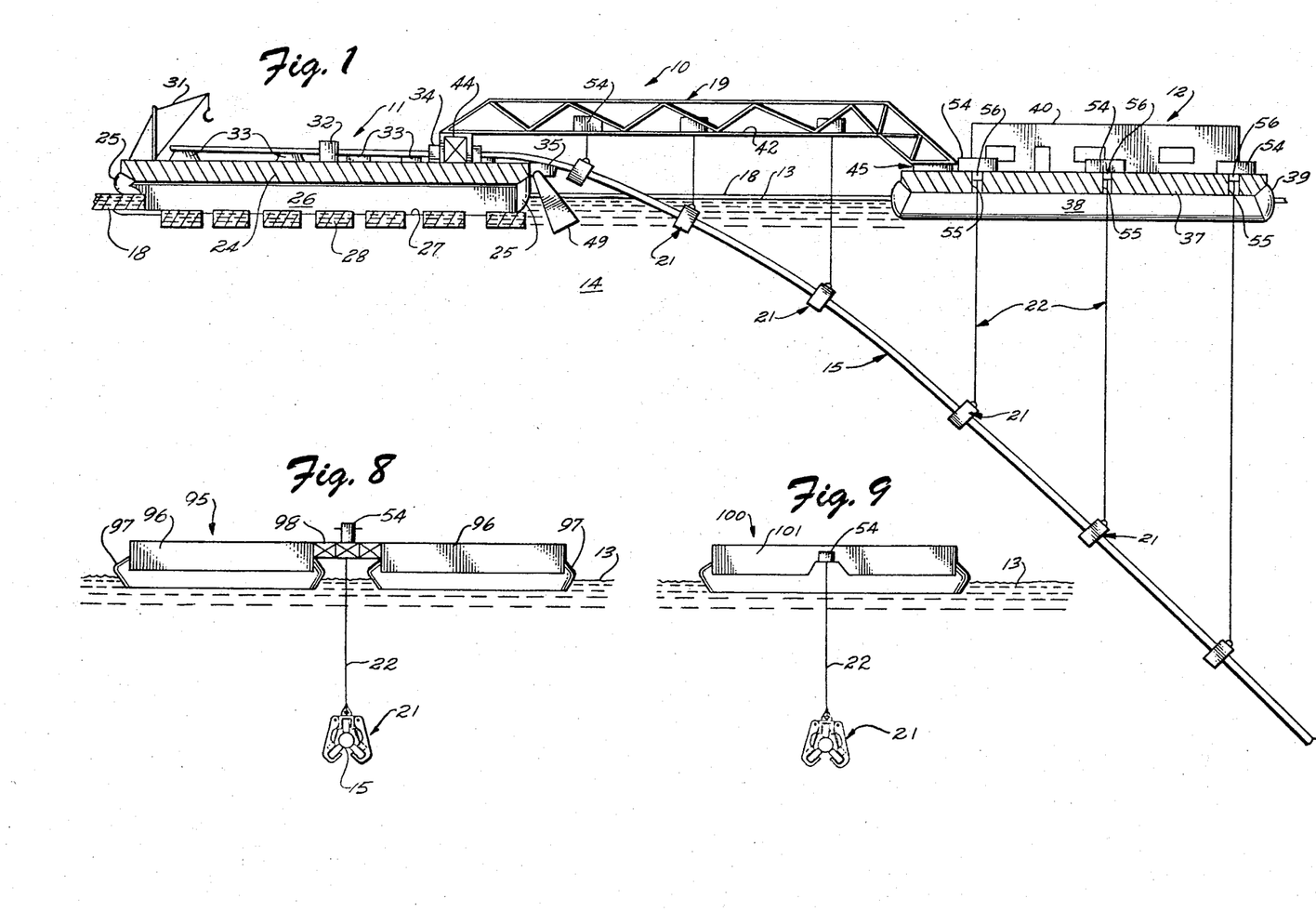
FIG. 1 is a cross-sectional elevation view of pipelaying apparatus according to this invention.
FIG. 8 is a cross-sectional elevation view of a catamaran form platform for the practice of this invention.
FIG. 9 is a cross-sectional elevation view of another form of the platform useful in the practice of this invention.
Figure 2:
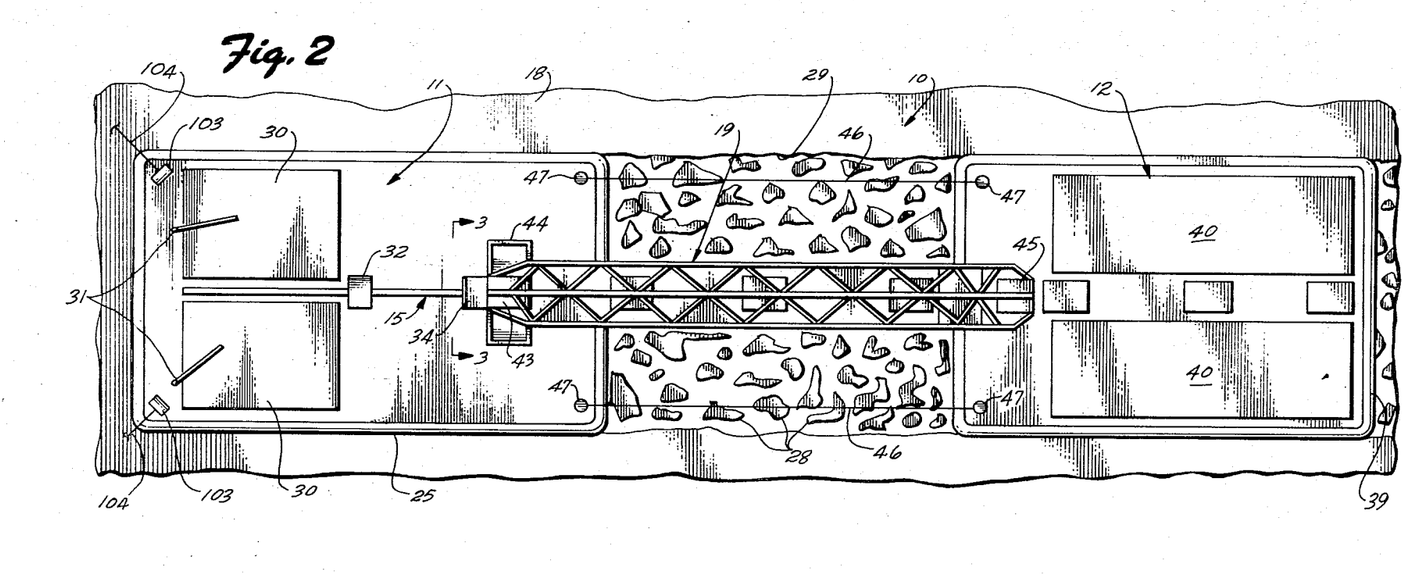
FIG. 2 is a top plan view of the apparatus shown in FIG. 1.
Figure 13:
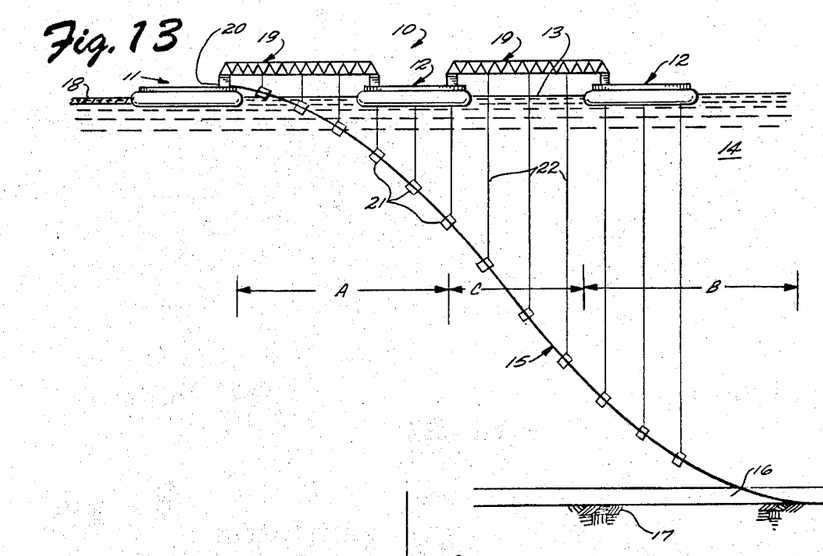
FIG. 13 is an overall elevation view of the structure of FIG. 1 in use.

Referring initially to FIGS. 1, 2 and 13, a pipelaying apparatus 10 includes a make-up platform 11 and at least one support platform 12 disposed above the surface 13 of a body of water 14 (such as an ocean) over a line along which a continuum of pipeline 15 is to be laid in a trench 16 formed in the earth or other geological formation defining sea floor 17. The water surface may be, and usually is, covered by a sheet of ice 18 during those periods in which pipelaying system 10 is used to great advantage. The make-up platform and the several support platforms, to the extent several support platforms are included in apparatus 10, are disposed in spaced relation along the line of the pipeline. An elongate, substantially rigid bridge structure 19 is connected between each adjacent pair of platforms above the water surface to dispose the platforms in the proper spacing relative to each other within the apparatus.

Pipeline continuum 15 has a "live" or building end 20 on make-up platform 11, and extends from the rear of the platform into the water between the make-up platform and the first support platform to extend into the bottom of trench 16 along a path of desired curvature through water body 14. Conventionally, trench 16 is formed after the pipeline has been laid along sea floor 17. Along its length between the rear of make-up platform 11 and the point at which the pipeline continuum becomes supported on sea floor 17, the path of the continuum has an overbend portion A, a sag-bend portion B, and a transition portion C. In overbend portion A, pipeline continuum 15 bends from a substantially horizontal state on the make-up platform into the substantially straight sloped transition portion C. In its sag-bend portion B, the path of the pipeline bends from the lower extent of straight transition portion C into a substantially horizontal attitude associated with support of the pipeline by sea floor 17 within trench 16.

The pipeline continuum is engaged at intervals along its length between make-up platform 11 and sea floor 17 by corresponding ones of a plurality of coupling assemblies 21, each of which is supported by associated cable means 22 from corresponding stations associated with the bridge structures and support platforms. By adjusting the effective lengths of the several cable means for the several coupling assemblies, the pipeline continuum is caused to follow a predetermined path of selected curvature between the make-up platform and sea floor 17. This path is selected so that the total length of the pipeline within the water body, i.e., between make-up platform 11 and sea floor 17, is as short as possible consistent with the radius of curvature of the path through overbend portion A and sag-bend portion B being sufficiently great that the continuum is not bent sufficiently to produce damage or failure of the pipeline before it comes to rest in trench 16.

As shown in FIG. 1, make-up platform 11 includes a barge-like buoyant hull 24 which is equipped with means for supporting the hull above water surface 13 and above ice sheet 18 on a cushion of air. The air cushion support means for the make-up platform includes an air cushion skirt assembly 25 connected around the lower periphery of the hull. Suitable blowers and ducting (not shown) are carried by the platform and are operable to pressurize ambient air and to supply the pressurized air to an air cushion space 26 within the skirt assembly below the bottom of hull 24. At least during those intervals in which apparatus 10 is advanced along the track of the pipeline, the pressure of air supplied to air cushion space 26 is sufficiently great to produce breakage of ice sheet 18 adjacent the make-up platform into pieces, such as ice pieces 28 shown in FIG. 1. The mechanisms by which an air cushion platform may be operated to produce breakage of an ice sheet are described in copending commonly-owned application Ser. No. 295,804 filed Oct. 10, 1972. As to the operation of make-up platform 11 to serve an ice-breaking function in pipelaying apparatus 10, such function is only one of the several functions performed by the make-up platform; it is sufficient to note that the pressure of air supplied to air cushion space 26 preferably should be sufficiently great to depress water surface 13 below the make-up platform hull to a level 27 sufficiently far below the normal level of water surface 13 to remove enough of the buoyant support of ice sheet 18 that the ice sheet fails by its own weight and by whatever additional loads may be applied to the ice sheet by the make-up platform. Preferably, depressed water level 27 is at least at, and preferably is below, the lower surface of ice sheet 18.

It has been found that where an air cushion vehicle is operated as an icebreaker in the manner described above and in copending application Ser. No. 295,804 filed Oct. 10, 1972, the vehicle operates to form a track 29 of broken ice below the vehicle, the track having a width substantially equal to the width of air cushion space 26. Ice pieces 28 broken from ice sheet 18 tend to move laterally of track 29 under the air cushion space so that some of the ice pieces become wedged under the ice sheet to the side of the track; the remaining ice pieces pass under the make-up platform and into the track to the rear of the platform. Because a substantial portion of the ice pieces are trapped under ice sheet 18 along the sides of track 29, the track to the rear of make-up platform 11 is relatively ice free.

Assuming the existence on make-up platform 11 of compressors or blowers of adequate capacity, the air pressure within air cushion space 26 is sufficient to produce the desired degree of depression of water surface 13. The level of this pressure is related to the effective area of air cushion space 26 and the effective weight of the make-up platform and the equipment carried by it.

Make-up platform 11 is the portion of pipelaying apparatus 10 where component lengths of pipeline 15 are connected to the live end of the pipeline continuum in a conventional manner. Accordingly, make-up platform 11 includes storage areas for discrete lengths of pipeline, materials handling equipment such as stiff-leg cranes 31 for manipulating the pipeline lengths, a welding station 32 where individual pipeline lengths have their rear ends welded to the live end of continuum 15, suitable support structures 33 for the pipeline length being welded and for the continuum adjacent its live end to the rear of weld station 32, and a pipeline tensioner mechanism 34. Pipe tensioner 34 is disposed to the rear of weld station 32, preferably along the centerline of the make-up platform, adjacent the rear of the make-up platform but to the front of a pipeline guiding and support structure 35 which extends from the rear side wall or transom of the make-up platform. The pipeline tensioner may be on conventional construction and arrangement and is provided in make-up platform 11 to impart tension to the portion of pipelaying continuum 15 which extends rearwardly and downwardly from the make-up platform to sea floor 17. The presence of tension in this portion of the continuum is desired to facilitate control over the catenary characteristics of the pipeline between the make-up platform and the sea floor. Also, tensioner 34 prevents the portion of the pipeline between the make-up platform and the sea floor from pulling loose from the make-up platform due to its own weight. As is conventional, the tensioner is operable to produce controlled rearward feeding of the pipeline continuum through it during those stages of the operation of pipelaying apparatus 10 when the apparatus is being advanced in the direction of pipeline propagation so as to bring the forward end of a pipeline length fully welded to the continuum into position in welding station 32 for the connection of another pipeline length to the live end of the continuum.

Support platform 12 includes a buoyant hull 37. The support platform may be floated in broken ice track 29 astern of make-up platform 19, if desired. It is preferred, however, that support platform hull 37 be supported above water surface 13, and above any ice pieces 28 in the track between the make-up and support platforms, on a cushion of air provided in an air cushion space 38 below the bottom of hull 37 within a peripheral skirt assembly 39 carried by the hull. Air cushion support of each support platform included within pipelaying apparatus 10 is preferred so that the platform can progress along the line of propagation of the pipeline over any ice which may re-form within track 29 ahead of the platform. Also, air cushion support of the support platform over track 29 safeguards the platform from damage or destruction in the event that the track tends to close in response to wind action or the like.

Preferably, support platform 12 includes a house 40 within which are provided stores, supplies and quarters for the personnel of pipelaying apparatus 10.

Each adjacent pair of platforms of the pipelaying apparatus is interconnected by an elongate rigid bridge structure 19. Thus, as shown in FIG. 1, a bridge structure 19 is connected from adjacent the rear end of the make-up platform to adjacent the forward end of the support platform. The bridge structure is of truss-like structural arrangement and includes a horizontal deck 42 by which personnel can move between the platforms. Upon the deck are mounted components of the continuum support assemblies associated with the bridge structure; these support assemblies and those associated with platform 12 are described in greater detail hereinafter.

Figure 3:
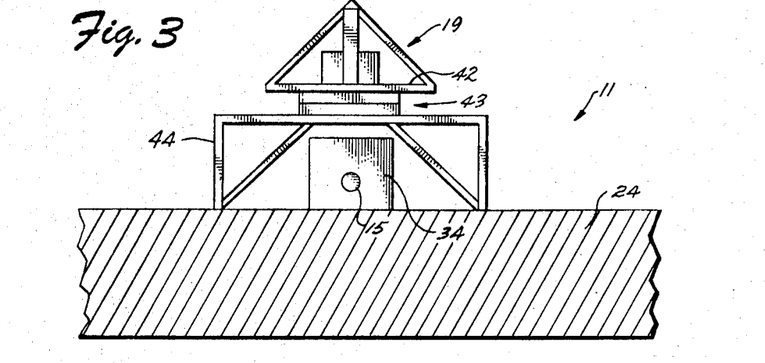
FIG. 3 is an enlarged cross-section view taken along line 3—3 in FIG. 2.

As shown best in FIG. 3, a coupling mechanism 43 is provided between the forward end of bridge structure 19 and a support foundation 44 carried by the make-up platform. As illustrated, foundation 44 bridges pipe tensioner 34 and provides a structural mechanism for transferring a portion of the load carried by the bridge structure to make-up platform 11. Coupling mechanism 43 is defined to accommodate limited pitching, rolling, yawing and heaving motions of the make-up platform relative to the bridge structure and support platform 12. A similar coupling mechanism 45 is provided between the rear end of the bridge structure and support platform 12.

Bridge structure 19 provides general positioning of support platform 12 a selected distance astern of make-up platform 11. It is preferred, however, that the bridge structure not be relied upon to define the precise spacing between the platforms so that the coupling mechanisms between the bridge structure and the platforms may be simplified and so that the bridge structure can be made as long as possible and as lightweight as possible. As shown best in FIG. 2, the make-up and support platforms are interconnected by a plurality of cables 46 secured at their opposite ends to bollards or cleats 47 carried by the make-up platform adjacent its rear end and by the support platform adjacent its front end. The presence of ice pieces 28 in track 29 tends to impede the movement of the support platform toward the make-up platform. In the event that the ice pieces do not sufficiently brake the movement of the support platform toward the make-up platform, the support platform may be connected to ice sheet 18 via cables (not shown) extended from suitable winches (not shown, but see winches 103 on the forward quarters of the make-up platform) on the support platform to anchors or the like disposed in the ice sheet laterally from track 29 and somewhat to the rear of the support platform so that tension is maintained in cables 46. Such mooring of the support platform to the ice sheet may be desirable in order that the support platform may maintain its desired position over the center of track 29 notwithstanding the effects of wind upon the support platform.

Figure 4:
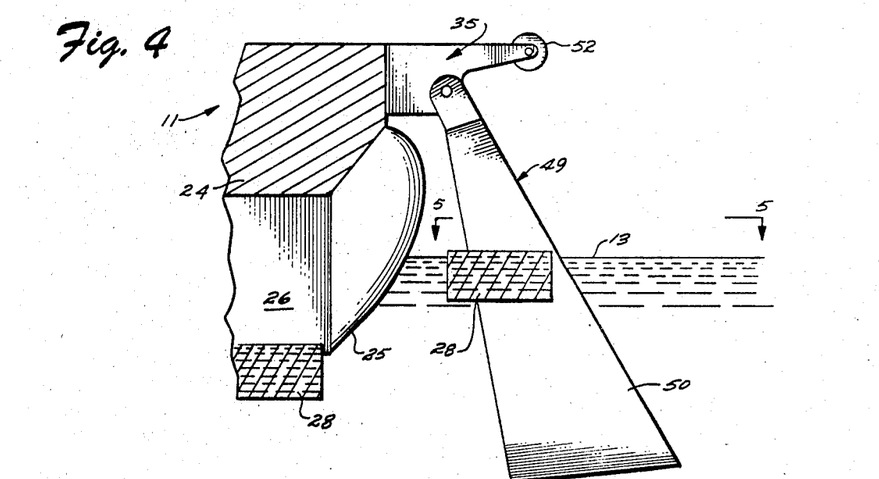
FIG. 4 is an enlarged fragmentary elevation view, partially in cross-section, of the ice diverting mechanism provided at the rear of the make-up platform and shown at the left in FIGS. 1 and 2.
Figure 5:
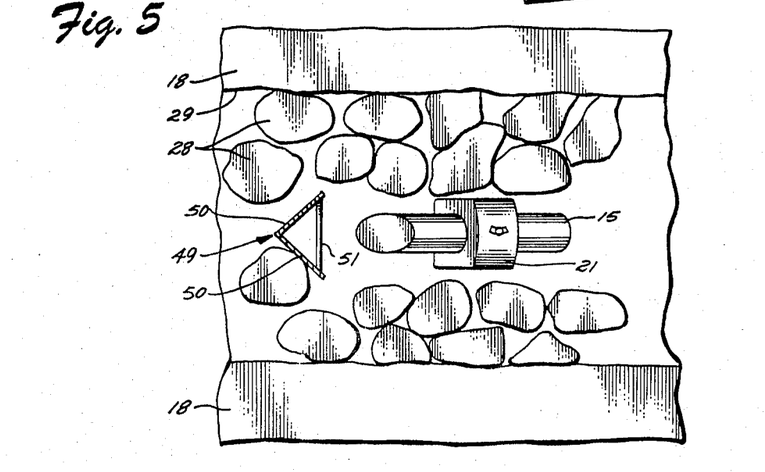
FIG. 5 is a view taken along line 5—5 in FIG. 4.

An ice diverter assembly 49 (see FIGS. 1, 4 and 5) is pivoted at its upper end to pipeline support and guide 35 at the rear of make-up platform 11. The diverter is relatively massive so that it tends to be disposed in the position shown in FIG. 4 during use of the pipelaying apparatus. As shown best in FIG. 5, diverter 49 includes a pair of heavy metal plates 50 which intersect each other at their forward edges along the centerline of the make-up platform with which pipeline continuum 15 is aligned. Plates 50 diverge from each other proceeding outwardly and rearwardly from their intersecting forward edges. At spaced locations along the length of the diverter, the inner rear surfaces of the plates are interconnected by braces 51. Preferably, plates 50 increase in width proceeding along the length of the diverter away from the pivotal connection of the diverter to support 35. During periods when make-up platform 11 may be moved on a cushion of air from place to place between work locations, diverter 49 is retracted from its operative position shown in FIG. 4 by hinging the diverter rearwardly into a horizontal position; this is done by a cable connected to the diverter and led over roller 52 carried at the rear end of guide end support 35, which roller cooperates with pipeline continuum 15 during pipelaying operations. As shown in FIG. 5, the distance between the rear edges of plates 50 is greater than the diameter of pipeline continuum 15. Accordingly, during pipelaying operations through ice covered waters, diverter 49 deflects ice pieces 28 floating within track 29 to the side of the track so that pipeline continuum 15 enters the water in an ice-free area to the rear of make-up platform 11.

During pipelaying operations, pipeline continuum 15 is engaged at spaced locations along its length between the make-up platform and the sea floor, and below bridge structures 19 and support platforms 12, by corresponding ones of a plurality of coupling assemblies 21. Each coupling assembly is a component of a pipeline support assembly which also includes the cable means connected to each coupling assembly, and a winch mechanism 54. A number of winches 54, corresponding in number to the number of coupling assemblies, are spaced along the length of each bridge structure and support platform in pipelaying apparatus 10. The winches are each separately operable to reel in and pay out the cable means for each coupling assembly so that the configuration of the path followed by pipe continuum 15 between make-up platform 11 and sea floor 17 is adjustable to the curvature desired for best pipelaying efficiency of the apparatus at any given point along the path of the pipeline. It is preferred that the winches associated with bridge structures 19 be mounted to bridge deck 42; it is also preferred that the winches associated with support platforms 12 be mounted to the deck of the platform, and that the cable means for the support platform winches be fed vertically downwardly through the hull via passages 55 and suitable sealing arrangements 56 which prevent the leakage of pressurized air from air cushion space 38.

Figure 6:
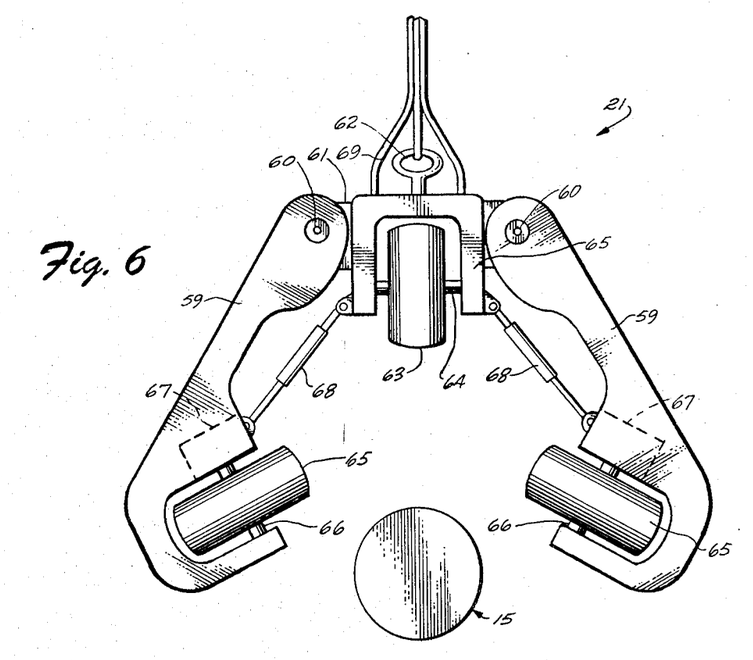
FIG. 6 is an elevation view of a pipeline coupling assembly.
Figure 7:
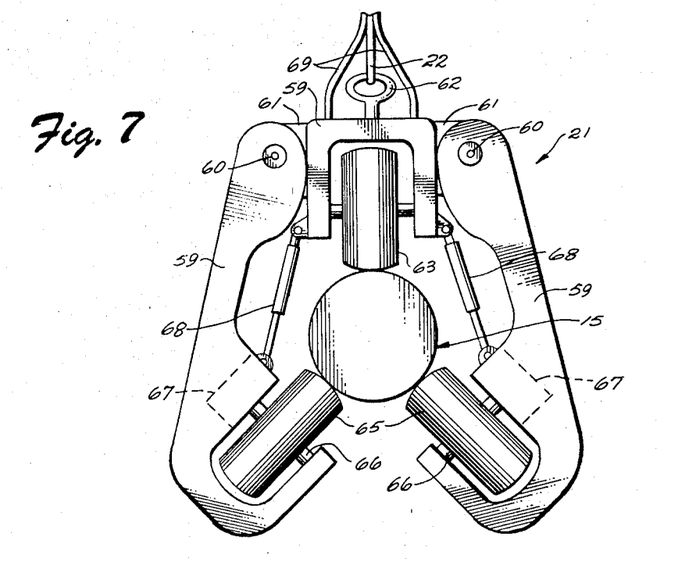
FIG. 7 is an elevation view similar to FIG. 6 showing the structure of FIG. 6 in another operative condition thereof.

FIGS. 6 and 7 are elevation views showing a coupling assembly 21 in its open and closed positions, respectively, relative to pipeline continuum 15. Each coupling assembly includes a central member 58 and a pair of end members 59. Each end member is hinged at 60 to a lug 61 extending laterally from an adjacent side of the central member which is of inverted U-shape configuration. A cable 22 for each coupling assembly is connected to the coupling assembly via an eye 62 carried by the central member at about its midlength. A wheel 63 of suitable diameter is carried on an axle 64 between the parallel legs of the central member for engaging an upper portion of the pipeline, as shown in FIG. 7. A wheel 65 is carried by each end member 59 at its end remote from hinge 60. Each wheel 65 is carried on a shaft 66 of a reversible motor 67 which is either disposed within the end member or is mounted to the end member, as desired. A reversible controllable drive mechanism, such as a double-acting hydraulic ram 68, is coupled between central member 58 and each end member 59 for driving the end members between their open and closed positions, shown in FIGS. 6 and 7 respectively, relative to the central member. Preferably, the reversible drive motors 67 for wheels 65 are reversible hydraulic motors, although electric motors may be used, if desired. Control and motive power for the wheel drive motors and the end member drive means are supplied to coupling assembly 21 via suitable cables or conduits 69 extended to the coupling assembly from the corresponding winch mechanism in association with cable 22.

End members 59 of coupling assembly 21 are arranged so that, when upper wheel 63 is engaged with pipeline 15 and drive mechanisms 68 are operated to move the end members into their closed position, wheels 65 are brought into engagement with the pipeline along its lower extent. Preferably wheels 63 and 65 have resilient treads so that substantial friction is generated between the pipeline and the wheels when the coupling assembly is in its closed condition. The presence of substantial friction between the peripheries of wheels 65 and pipeline 15 means that substantial force will be imparted to the pipeline along its length, in one direction or the other, in response to the operation of motors 67 in one direction or the other. In coupling assembly 21, wheel 63 is an idler.

It is a feature of pipelaying apparatus 10 that it may be used to lay pipe both over land and under water. If pipelaying operations are commenced over water, apparatus 10 is assembled either at that location or at some remote location and subsequently moved to the pipelaying location. During movement of the apparatus from the remote assembly station, platforms 10 and 12 are supported on a cushion of air and are towed or selfpropelled across the ice and water surface. On arrival of the apparatus at the location where submarine operations are to be commenced, the apparatus is aligned with the direction of the pipeline and is moved into position so that a track 29 of at least partially open water is formed through ice sheet 18 in the manner described above. The first several short lengths of pipeline components are made up on make-up platform 11 so that the pipeline begins to emerge rearwardly from the make-up platform past support and guide structure 35 toward the forwardmost coupling assembly 21. The winch mechanism associated with the first coupling assembly is operated so that, as the rear end of the growing pipeline emerges from the make-up platform it is engaged by the first coupling assembly. The growing pipeline continuum 15 is disposed horizontally above water surface 13 until it has been engaged by all of the coupling assemblies associated with the forward bridge structure. Thereafter, these several coupling assemblies are lowered so that the rear end of the growing pipeline continuum is lowered, due primarily to the weight of the pipeline continuum itself, to pass under skirt 39 for the first support platform 12. As the pipeline make-up operations are continued and the continuum is further fed rearwardly from the make-up platform, the rear end of the continuum passes below support platform 12 to be engaged sequentially by the coupling assemblies associated with the first support platform. In a similar manner, the growing continuum is engaged successively by the coupling assemblies associated with the second and succeeding bridge structures and support platforms, if any, of pipelaying apparatus 10. At the time the continuum is first engaged by the rearmost coupling assembly of the apparatus, the continuum is disposed in a substantially horizontal attitude below the support platforms. Continued additions of discrete pipeline lengths to the live end of the continuum, and further feeding of the continuum rearwardly of the make-up platform, is done in conjunction with controlled lowering of the several coupling assemblies until the rear end of the continuum moves into contact with sea floor 17 and the desired curved path is defined for the continuum between the make-up platform and the sea floor. At this point, the overbend and sag-bend portions of the pipeline path will have been defined between the make-up platform and the sea floor.

So long as the several coupling assemblies 21 are positioned to cause the pipeline continuum to lie substantially parallel to water surface 13, the weight of the continuum will not be so manifested at the make-up platform to induce the continuum to move rearwardly of the platform. However, as the coupling assemblies are lowered to define the reversely curved continuum path shown in FIG. 13, for example, the weight of the continuum will be increasingly manifested at pipe tensioner 34 as a force tending to pull the continuum rearwardly of the make-up platform through the pipe tensioner. The tendency of the continuum to pull itself from the make-up platform can be reduced or completely eliminated by operating the drive motors for coupling assembly wheels 65 in a direction tending to drive the continuum toward the make-up platform. In this manner, a relatively low capacity pipe tensioner may be used on make-up platform 11 to lay pipeline in water depths within the present capacity of the technology pertinent to submarine pipelaying, or the largest pipe tensioner now available may be included in make-up platform 11 to enable the laying of pipelines in water depths far beyond the present capacity of this technology. According to existing practice in marine pipelaying technology, the tensioning capacity of pipe tensioner 34 directly controls the depth of water at which a pipeline of specified diameter and weight per foot of length can be laid. Therefore, by inclusion in pipelaying apparatus 10 of an appropriate number of coupling assemblies 21, each of which has a capacity to impart some degree of tension to pipeline engaged thereby, pipelines of any diameter and weight per foot of length desired can be laid in substantially any depth of water desired.

Preferably, tensioning capacity of tensioner 34 and the several coupling assemblies 21 is somewhat in excess of the maximum pipe tensioning capacity required to prevent the continuum between the make-up platform and sea floor 17 from undesirably pulling loose from make-up platform 11. This excess tensioning capacity is desired so that at least one of the coupling assemblies can be operated at any given time to drive itself along the pipeline continuum toward the make-up platform; this is done in connection with advancement of pipelaying apparatus 10 along the route of the pipeline. That is, once the pipeline continuum is brought into engagement with the sea floor and the desired recurved path has been established between the make-up platform and the sea floor, the addition of each discrete component length to the live end of the continuum requires that the pipelaying apparatus be advanced along the pipeline route by at least an equal distance if the desired recurved path is to be maintained between the make-up platform and the sea floor. Preferably, this repositioning of the several coupling assemblies on the continuum is accomplished sequentially by operating drive motors 67 of one or several, but not all, of the coupling assemblies at any given time to cause those coupling assemblies to advance themselves along the continuum toward the make-up platform. After a coupling assembly has been repositioned along the continuum, its drive motors 67 are operated to develop tension in the continuum as other coupling assemblies are repositioned along the continuum. As each coupling assembly is advanced along the continuum toward the make-up platform, the winch 54 for that coupling assembly is operated so that the appropriate tension in cables 22 is maintained to preserve the desired curved path for the continuum between the make-up platform and the sea floor. In this manner, the proper tension and catenary characteristics can be maintained in the portion of the continuum which has not yet come to rest in trench 16 without exceeding the tensioning capacity of pipe tensioner 34.

In FIGS. 1 and 13, coupling assemblies 21 are shown to be located directly below their corresponding winches during operation of the pipelaying apparatus. Workers skilled in the art to which this invention pertains will readily appreciate that the operative positions of the coupling assemblies along the continuum may be displaced a selected distance rearwardly from the corresponding winches so that the resultant force applied to the several cables 22 may have components of the proper magnitude along the axis of the continuum, depending upon the force of engagement between wheels 65 and continuum 15 and the coefficient of friction existing between the wheels and the continuum.

Figure 10:
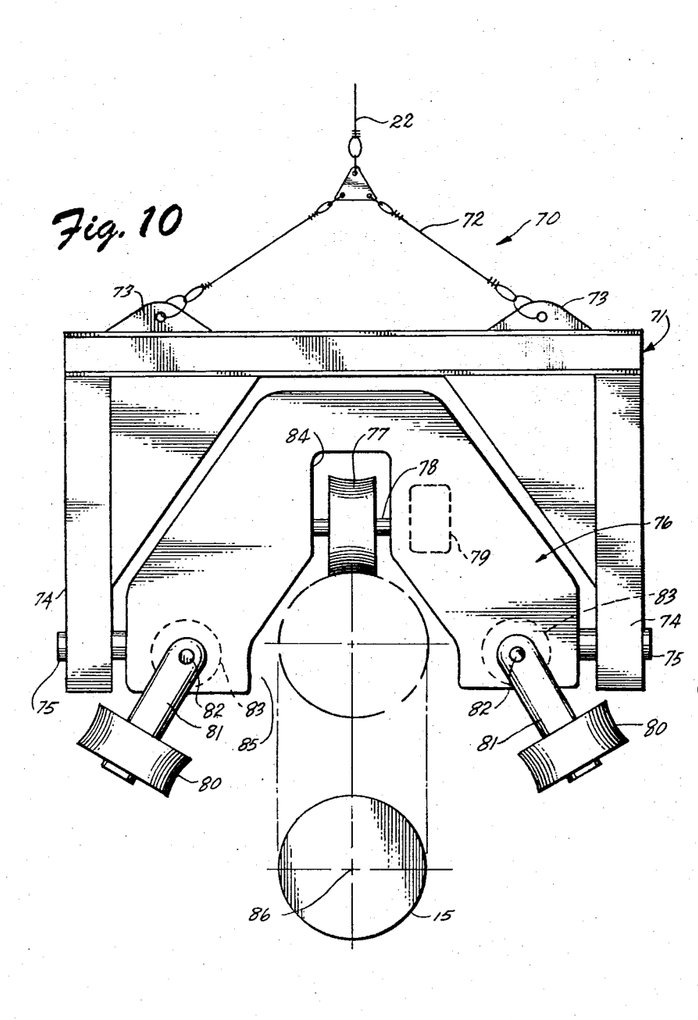
FIG. 10 is an elevation view of another form of coupling assembly according to this invention.
Figure 11:
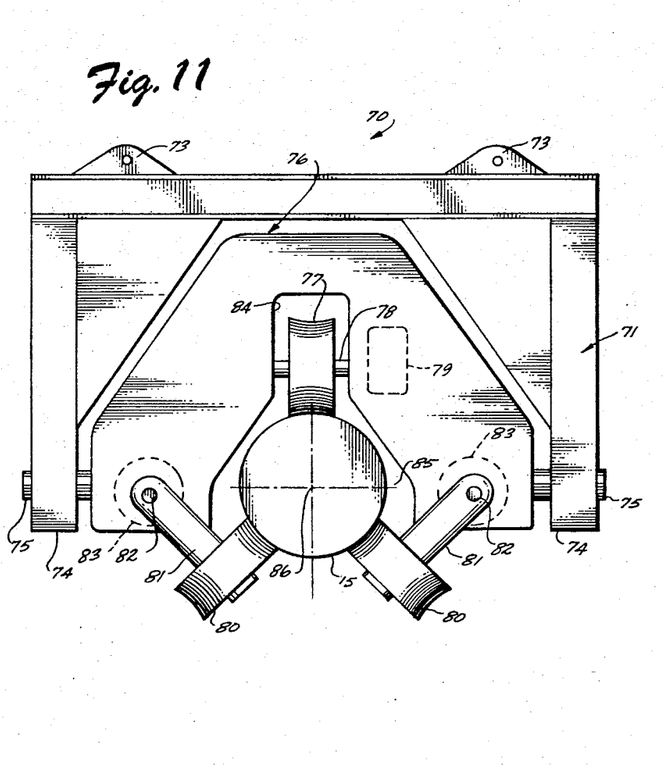
FIG. 11 is a view similar to that of FIG. 10 showing the structure of FIG. 10 in a different operative state thereof.
Figure 12:
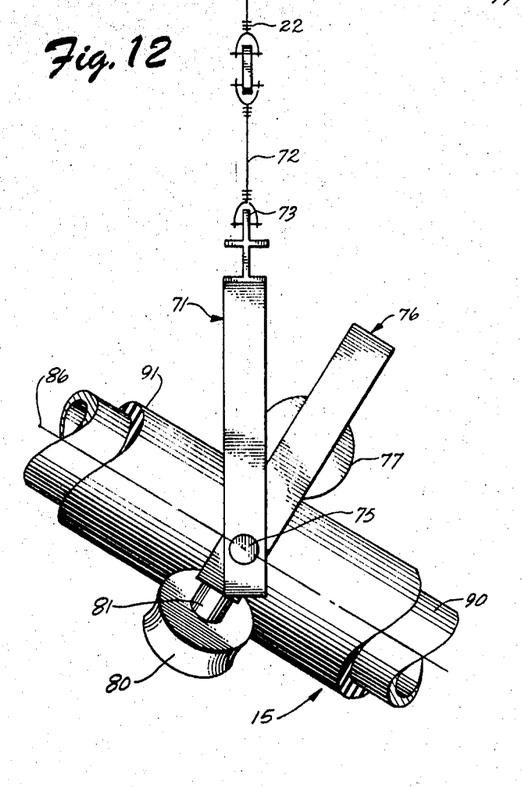
FIG. 12 is an elevation view of the structure shown in FIG. 11 illustrating the ability of that structure to conform to a desired inclination of pipeline with which it is engaged.

Another coupling assembly 70 is shown in FIGS. 10, 11 and 12, and may be used to advantage in pipelaying apparatus 10 in place of coupling assemblies 21 described above. FIG. 10 shows coupling assembly 70 in its open position relative to pipeline continuum 15, whereas FIG. 11 shows the coupling assembly in its closed position engaged about the continuum. FIG. 12 is a side elevation view of the coupling assembly as engaged with the pipelaying continuum and shows the adaptability of the coupling assembly to conform to the slope of the pipeline continuum at any location desired between makeup platform 11 and sea floor 17.

Each coupling assembly 70 includes an inverted U-shaped yoke member 71 which is coupled to cable means 22 via bridle assembly 72 and spaced lifting pads 73 secured to the upper extent of the yoke member. The yoke member has spaced parallel legs 74 which, at their lower ends, support coaxially aligned trunions 75. The inner ends of the trunions engage and rotatably support a carrier member 76 which has a substantially inverted U-shaped configuration. The carrier member mounts a drive wheel 77 which is keyed to a drive shaft 78 at a location above and parallel to the trunion hinge axis. Shaft 78 is driven in either direction at a desired rate by appropriate operation of a reversible motor 79, preferably a hydraulic motor, within the carrier member. The carrier member also mounts a pair of support wheels 80 each of which is rotatably mounted to the unsupported end of a support arm 81, the other end of which is fixed to a shaft 82 of a reversible motor 83 mounted to the carrier member adjacent a corresponding one of trunions 75. Motors 83 also preferably are hydraulic motors, but it is within the scope of this invention that these motors, as well as motors 79 for drive wheel 77, may be electric motors or the like.

Drive wheel 77 is disposed within a reduced width upward extension 84 of a downwardly open continuum-receiving recess 85 formed in the lower central portion of carrier member 76. The diameters of wheels 77 and 80, and the positioning of shafts 78 and 82, are selected so that, when support wheels 80 are disposed in their closed position about the pipeline continuum 15 to urge the upper portion of the continuum into contact with drive wheel 77, the axis along which trunions 75 are aligned intersects the longitudinal axis 86 of the continuum. Accordingly, as the coupling assembly is lowered into contact with the pipeline continuum (support wheels 80 being in their open position shown in FIG. 10), carrier member 76 is hinged relative to yoke member 71 to assume an attitude normal to the longitudinal axis of the continuum, which normal disposition is maintained as support wheels 80 are moved into their closed positions in response to operation of motors 83.

When the support wheels are enclosed about the pipeline continuum, as shown in FIG. 11, the continuum is forcefully urged into contact with the periphery of drive wheel 77 so that operation of motor 79 in one direction or the other is effective to cause the coupling assembly to be driven in a corresponding direction along the length of the pipeline continuum. Thus, coupling assembly 70 is operable in the same manner as coupling assemblies 21 to provide a pipe tensioning function. Preferably, drive wheel 77 and support wheels 80 are concavely circumferentially dished to conform to the radius of the pipeline continuum. This dishing of these wheels assures that the pipeline continuum is properly centered within recess 85 as the support wheels are moved into their closed positions, and assures that maximum frictional driving forces are applied by the drive wheel to the continuum by motor 79 via drive wheel 77.

FIG. 12 also illustrates that pipeline continuum 15 preferably is composed of a plurality of individual pipe lengths 90 serially and integrally interconnected with each other via weld station 32. The string of interconnected pipe lengths is circumferentially coated with an appropriate preservative layer 91, as is conventional. The outer surface of the preservative layer is rather rough, thereby enhancing the magnitude of the tensioning force which may be applied to the continuum via drive wheels 77.

FIG. 3 illustrates another platform 95 which may be used in the practice of this invention. Platform 95 is of catamaran configuration and includes a pair of spaced parallel elongate buoyant barge-like hulls 96 each of which is fitted with a circumferential air cushion skirt assembly 97. The hulls are interconnected along their adjacent edges by a deck structure 98 on which a plurality of winches for a corresponding number of pipeline support assemblies are disposed. A catamaran-type platform is of enhanced transverse stability compared to a single hulled air cushion platform. Catamaran platform 95 is best used as a support platform interconnected to a preceding monohull make-up platform by a bridge structure 19. Alternatively, the catamaran platform may be made of extreme length, as much as 1,000 feet or more in length, to serve as an integrated make-up and support platform for the pipelaying apparatus.

FIG. 9 is a simplified cross-sectional elevation view of another support platform 100 in which winches 54 are disposed within hull 101, rather than on the deck of the hull as is the case with support platform 12.

Pipelaying apparatus according to this invention, in which substantial portions of the pipelaying operation are carried out on buoyant platforms supported above the water surface on a cushion of air, may be used to particular advantage in the arctic during periods when the water surface is covered by ice sheet 18. The presence of the ice sheet adjacent open water track 29 eliminates all significant wave action which might otherwise be experienced under given climatic conditions. The non-existence of significant wave action in the water over which the make-up and support platforms are disposed means that bridge structures 19 may safely be coupled between adjacent platforms along the length of the pipelaying apparatus, and that pipelaying operations may be carried out in safety. It will be apparent that pipelaying apparatus 10 may also be used during those periods when water surface 13 is not covered by an ice sheet when the sea state is sufficiently low that wave action does not provide a hazard to the personnel and equipment involved in the pipelaying operation.

During usage of pipelaying apparatus to lay a pipeline through ice covered waters, the entire apparatus is advanced along the route of the pipeline by extending mooring lines from the make-up and support platforms to ice sheet 18. As shown in FIG. 2, mooring winches 103 are mounted on the forward quarters of make-up platform 11. From these winches, mooring lines 104 are extended to suitable pilings or anchors (not shown) secured to the ice sheet on opposite sides of the path of advance of the apparatus and forwardly thereof. Preferably, the anchors are prelocated in the ice sheet so that, as the pipelaying operation continues, mooring lines may be taken in by the winches to pull the apparatus along its desired path of travel. As the mooring lines are taken in sufficiently to cause the winches to be substantially abreast of the anchors to which the lines are connected, the lines are disconnected from those anchors and reconnected, preferably manually, to the next set of anchors along the path.

Conventionally, the pipeline is laid down on virgin sea floor 17 prior to the formation of trench 16. The trench usually is formed in the mud or silt of the sea floor by a jetting sled which tracks along the pipeline to form the trench under the pipeline. Where the sea floor is defined of rock or other consolidated formations, as adjacent a shoreline, the trench may be defined before the pipeline is laid down.

Air cushion pipelaying apparatus 10, or any of the variations thereof described above, may be used to particular advantage to lay pipeline over land and under water in arctic locations. One difficulty which has been encountered with pipelaying operations in the arctic is the logistical and operational problems presented by tundra and muskeg. During summer months, muskeg bogs present nearly impassable impediments to the movement of conventional wheeled or tracked vehicles. Also, the tundra is a layer of very fragile vegetation which has only a very short growing period, and this vegetative layer forms an insulative covering over the underlying permafrost. The preservation of the tundra is essential to the maintenance of the permafrost. For example, during World War II, tanks and the like were operated in northern Alaska over tundra with such frequency that they destroyed the tundra. As a result, during succeeding summers before the tundra could sufficiently reestablish itself, the permafrost melted to significant extents. The result of undesired permafrost melting is subsidence of the terrain. Thus, these tank and other vehicle tracks, created initially more than thirty years ago, are still visible as trenches 10 or more feet in depth and 30 or more feet in width. These trenches drastically alter local water courses, often with disastrous effects upon wildlife. Accordingly, the governmental regulatory agencies having jurisdiction over the land in northern Canada and Alaska have adopted regulations which restrict the passage of wheeled and tracked vehicles over the tundra, and permits are required before such vehicles may be operated. The scope of the permit which may be issued is dependent upon the effective footprint pressure of the vehicle and the tundra and the number of times the vehicle is to traverse a given path. The use of air cushion vehicles is particularly desirable over tundra because air cushion vehicles have an effective footprint pressure of 1 or 2 pounds per square inch, as opposed to several tens or hundreds of pounds per square inch for tracked or wheeled vehicles. Accordingly, air cushion vehicles can move almost at will over muskeg and tundra without adverse effect upon the local ecology. Thus, in the context of this invention, a particular advantage of air cushion make-up and pipeline support platforms is that the platforms themselves are as readily operated over land as over water. The same apparatus used to lay a pipeline through ice covered waters during winter months may be used to lay pipeline through muskeg bogs and across tundra at any time of the year.

Thus, an entire pipeline may be laid by pipelaying apparatus 10, for example, from a location well inland from an arctic shore, to the shore, and from the shore into and under the adjacent ocean. Accordingly, pipelaying apparatus according to this invention is essentially universally usable to lay pipeline in arctic locations.

If, during pipelaying operations through ice, laterally moving ice should be encountered, such laterally moving ice is broken in above-described manner as it enters under the side skirts of the make-up and support platforms.

The usage of the present pipelaying apparatus in arctic environments has been mentioned above extensively because it is believed that the present apparatus has its greatest utility in these applications. It will be apparent, however, that the present pipelaying apparatus can be used to advantage to lay pipelines in temperate and tropic areas, as through swamps and the like.

Especially where the present pipelaying apparatus is used for the laying of submarine pipelines, it is preferred that the platform elements of the apparatus have buoyant hulls. The presence of buoyant hulls in the platforms is particularly desirable to prevent the loss of men and equipment in the event that the air cushion support mechanisms for these platforms should fail for one reason or another.

The procedural and structural features of the present invention have been described above with reference to certain presently preferred embodiments of the invention. Workers skilled in the art to which this invention pertains will readily appreciate that alterations and variations in these procedures and structures may be practiced while still using the basic teachings and advances described above. It should also be understood that the foregoing description of presently preferred embodiments of the invention has been presented for the purposes of illustration and example, rather than as an exhaustive catalogue of all forms which the structural and procedural aspects of this invention may take. Accordingly, the foregoing description should not be regarded as limiting the scope of this invention to less than the scope of the following claims and their fair equivalents.

What is claimed is:

1. A method for laying submarine pipelines comprising the steps of
   a. making up the pipeline on a buoyant make-up platform disposed over the line along which the pipeline is to be laid,
   b. feeding make-up pipeline into the water rearwardly from the make-up platform,
   c. coupling a buoyant support platform disposed a selected distance rearwardly of the make-up platform along the line to the make-up platform by a bridge structure engaged between the platforms above the water surface,
   d. engaging the pipeline at spaced locations along its length rearwardly of the make-up platform with corresponding ones of a plurality of separately operable coupling assemblies each of which is supported by cable means to corresponding spaced locations along the bridge structure and the support platform, and
   e. adjusting the effective lengths of the several cable means to define a desired support path for said length of pipeline.

2. The method of claim 1 including operating at least some of the coupling assemblies to inhibit axial movement of the engaged pipeline therepast in a direction away from the make-up platform.

3. A method for laying submarine pipelines and the like in ice-covered waters comprising the steps of
   a. making up the pipeline on a make-up platform,
   b. supporting the make-up platform at a location over the line along which the pipeline is to be laid above the water surface and a covering ice sheet on a cushion of air at a pressure sufficient to cause breakage of the adjacent ice sheet,
   c. feeding made-up pipeline into the water rearwardly from the make-up platform,
   d. coupling a support platform disposed a selected distance rearwardly of the make-up platform along the line to the make-up platform by a bridge structure engaged between the platforms,
   e. engaging the pipeline at spaced locations along its length rearwardly of the make-up platform with corresponding ones of a plurality of separately operable coupling assemblies each of which is supported by cable means to corresponding spaced locations along the bridge structure and the support platform, and
   f. adjusting the effective lengths of the several cable means to define a desired support path for said length of pipeline.

4. The method of claim 3 including making up the pipeline in a substantially horizontal attitude on the make-up platform whereby the pipeline between the make-up platform and the submerged surface on which it is to be laid has an overbend adjacent the make-up platform and a sag-bend adjacent said submerged surface, and wherein the length of the pipeline in which the coupling assemblies are engaged with the pipeline extends through the overbend at least partially toward the sag-bend.

5. The method of claim 4 including operating at least some of the coupling assemblies to inhibit movement of the pipeline therepast.

6. The method of claim 5 including moving the coupling assemblies relatively along the pipeline toward the make-up end thereof in conjunction with advancing the platforms along the line of the pipeline.

7. The method of claim 6 wherein the step of moving the coupling assemblies relatively along the pipeline is performed by moving some of the coupling assemblies along tthe pipeline while operating others of the coupling assemblies to inhibit movement of the pipeline therepast.

8. The method of claim 3 including supporting the support platform on a cushion of air.

9. Apparatus for laying a submarine pipeline comprising
   a. a buoyant make-up platform including means for connecting an increment of pipeline to a make-up end of a continuum of pipeline and for discharging the continuum rearwardly from the make-up platform along the line along which the pipeline is to be laid,
   b. a buoyant support platform,
   c. an elongate bridge structure adapted to be coupled between the make-up and support platforms for disposing the support platform a selected distance rearwardly from the make-up platform along said line and to extend between the platforms above the water surface, and
   d. a plurality of separately operable support assemblies for supporting the continuum for a portion of its length rearwardly adjacent the make-up platform below the bridge structure and the support platform, each support assembly including a coupling assembly releasably engageable about the continuum, cable means connected between the coupling assembly and a corresponding one of a plurality of stations spaced along the bridge structure and the support platform, and controllable means at each station for taking in and paying out the associated cable means.

10. Apparatus according to claim 9 wherein at least some of the coupling assemblies include selectively operable means for driving the coupling assembly in a desired direction along a pipeline continuum engaged thereby.

11. Apparatus for laying a submarine pipeline comprising
    a. buoyant make-up platform including means for connecting an increment of pipeline to a make-up end of a continuum of pipeline and for discharging the continuum rearwardly from the make-up platform along the line along which the pipeline is to be laid,
    b. a buoyant support platform,
    c. an elongate bridge structure adapted to be coupled between the make-up and support platforms for disposing the support platform a selected distance rearwardly from the make-up platform along said line, and
    d. a plurality of separately operable support assemblies for supporting the continuum for a portion of its length rearwardly adjacent the make-up platform below the bridge structure and the support platform, each support assembly including a coupling assembly releasably engageable about the continuum, cable means connected between the coupling assembly and a corresponding one of a plurality of stations spaced along the bridge structure and the support platform, and controllable means at each station for taking in and paying out the associated cable means, at least some of the coupling assemblies including a wheel arranged to engage a pipeline continuum engaged by the coupling assembly and rotatable about an axis substantially normal to the elongate extent of the engaged continuum, means for producing forceful contact between the wheel and the engaged continuum, and means for driving the wheel about its axis in a direction tending to produce movement of the wheel along the continuum away from the make-up platform.

12. Apparatus according to claim 11 wherein the wheel is disposed in the coupling assembly to contact an upper portion of an engaged continuum.

13. Apparatus according to claim 11 wherein the wheel is disposed in the coupling assembly to contact a lower portion of an engaged continuum.

14. Apparatus for laying a pipeline under ice-covered waters comprising
    a. a make-up platform including means for connecting an increment of pipeline to a make-up end of a continuum of pipeline and for discharging the continuum rearwardly from the make-up platform along the line along which the pipeline is to be laid, b. means for supporting the make-up platform at a desired location over the line above the water surface and ice covering the same on a cushion of air at a pressure sufficient to cause breakage of the adjacent ice, c. a buoyant support platform, d. an elongate bridge structure adapted to be coupled between the make-up and support platforms for disposing the support platform a selected distance rearwardly from the make-up platform along said line and to extend between the platforms above the water surface, and e. a plurality of separately operable support assemblies for supporting the continuum for a portion of its length rearwardly adjacent the make-up platform below the bridge structure and the support platform, each support assembly including a coupling assembly releasably engageable about the continuum, cable means connected between the coupling assembly and a corresponding one of a plurality of stations spaced along the bridge structure and the support platform, and controllable means at each station for taking in and paying out the associated cable means.

15. Apparatus according to claim 14 including means for supporting the support platform above the water surface on a cushion of air.

16. Apparatus according to claim 14 wherein the horizontal extent of the apparatus along which said stations are spaced is substantially equal to the horizontal extent of a pipeline continuum extended between the make-up platform and a submerged surface along which the continuum is laid.

17. Apparatus according to claim 14 wherein the coupling assemblies are adapted to engage a pipeline continuum extending between the make-up platform and a submerged continuum support surface at spaced locations along the continuum from the make-up platform at least partially toward a sag-bend in the continuum adjacent the continuum support surface.

18. Apparatus according to claim 17 wherein some of the support assemblies are disposed to support the continuum in the sag-bend of the continuum.

19. Apparatus for laying a pipeline under ice-covered waters comprising a. a make-up platform including means for connecting an increment of pipeline to a make-up end of a continuum of pipeline and for discharging the continuum rearwardly from the make-up platform along the line along which the pipeline is to be laid, b. means for supporting the make-up platform at a desired location over the line above the water surface and ice covering the same on a cushion of air at a pressure sufficient to cause breakage of the adjacent ice, c. a buoyant support platform, d. an elongate bridge structure adapted to be coupled between make-up and support platforms for disposing the support platform a selected distance rearwardly from the make-up platform along said line, e. a plurality of separately operable support assemblies for supporting the continuum for a portion of its length rearwardly adjacent the make-up platform below the bridge structure and the support platform, each support assembly including a coupling assembly releasably engageable about the continuum, cable means connected between the coupling assembly and a corresponding one of a plurality of stations spaced along the bridge structure and the support platform, and controllable means at each station for taking in and paying out the associated cable means, and f. means disposed rearwardly of and adjacent the make-up platform for diverting floating ice pieces laterally therefrom to provide an ice-free area of water surface rearwardly thereof.

20. Apparatus according to claim 19 including means for guiding a pipeline continuum from the make-up platform into the water through said ice-free area of water surface.

21. Apparatus according to claim 19 including means for retracting said means for diverting floating ice pieces.

22. Apparatus for laying a pipeline under ice-covered waters comprising a. a make-up platform including means for connecting an increment of pipeline to a make-up end of a continuum of pipeline and for discharging the continuum rearwardly from the make-up platform along the line along which the pipeline is to be laid, b. means for supporting the make-up platform at a desired location over the line above the water surface and ice covering the same on a cushion of air at a pressure sufficient to cause breakage of the adjacent ice, c. a buoyant support platform, d. an elongate bridge structure adapted to be coupled between make-up and support platforms for disposing the support platform a selected distance rearwardly from the make-up platform along said line, e. a plurality of separately operable support assemblies for supporting the continuum for a portion of its length rearwardly adjacent the make-up platform below the bridge structure and the support platform, each support assembly including a coupling assembly releasably engageable about the continuum, cable means connected between the coupling assembly and a corresponding one of a plurality of stations spaced along the bridge structure and the support platform, and controllable means at each station for taking in and paying out the associated cable means, and f. means for coupling the bridge structure to the make-up platform and to the support platform and arranged to accommodate limited relative pitching, rolling, yawing, and heaving motions between the platforms.

23. Apparatus for laying a pipeline under ice-covered waters comprising a. a make-up platform including means for connecting an increment of pipeline to a make-up end of a continuum of pipeline and for discharging the continuum rearwardly from the make-up platform along the line along which the pipeline is to be laid, b. means for supporting the make-up platform at a desired location over the line above the water surface and ice covering the same on a cushion of air at a pressure sufficient to cause breakage of the adjacent ice, c. a buoyant support platform, d. an elongate bridge structure adapted to be coupled between make-up and support platforms for disposing the support platform a selected distance rearwardly from the make-up platform along said line, and e. a plurality of separately operable support assemblies for supporting the continuum for a portion of its length rearwardly adjacent the make-up platform below the bridge structure and the suport platform, each support assembly including a coupling assembly releasably engageable about the continuum, cable means connected between the coupling assembly and a corresponding one of a plurality of stations spaced along the bridge structure and the support platform, and controllable means at each station for taking in and paying out the associated cable means, each coupling assembly including a plurality of wheels each rotatable about an axis substantially normal to the elongate extent of a pipeline continuum engaged by the coupling assembly and each engageable with an engaged continuum, reversible power means for moving the wheels relative to each other between an open state in which the coupling assembly is disposed to engage a continuum and a closed state in which the wheels forcefully contact a continuum at positions spaced about the circumference thereof, and wherein at least some of the coupling assemblies include drive means for rotating at least one of the wheels in a direction tending to drive the wheel along an engaged continuum away from the make-up platform.

24. Apparatus according to claim 23 wherein the coupling assembly includes a single driven wheel arranged to contact an upper portion of an engaged continuum.

25. Apparatus according to claim 23 wherein the coupling assembly includes a pair of driven wheels arranged to contact lower portions of an engaged continuum.

26. Apparatus according to claim 23 wherein each coupling assembly which includes a driven wheel further includes means interposed between the corresponding cable means and the wheels for maintaining a desired cooperation of the wheels with an engaged continuum throughout variations in the attitude of the engaged continuum.

27. Apparatus according to claim 26 wherein the means interposed between the cable means and the wheels comprises a carrier member mounting the wheels thereto, a yoke member connected to the cable means, and pivot means mounting the carrier member to the yoke member for relative angular motion about an axis normal to and intersecting the axis of an engaged continuum.

28. A method for laying submarine pipelines comprising the steps of a. making up the pipeline on a buoyant make-up platform disposed over the line along which the pipeline is to be laid, b. feeding made-up pipeline into the water rearwardly from the make-up platform, c. coupling a buoyant support platform disposed a selective distance rearwardly of the make-up platform along the line to the make-up platform by a bridge structure engaged between the platforms above the water surface, d. engaging the pipeline at spaced locations along its length rearwardly of the make-up platform, including at locations below the water surface, with corresponding ones of a plurality of separately operable coupling assemblies each of which is supported by cable means to corresponding spaced locations along the bridge structure and the support platform, e. adjusting the effective lengths of the several cable means to define a desired support path for said length of pipeline, and f. operating at least some of the coupling assemblies, including some of those located below the water surface, to inhibit axial movement of the engage pipeline therepast in a direction away from the make-up platform.

* * * * *